US006062473A

United States Patent [19]

Blalock et al.

[11] Patent Number: 6,062,473

[45] Date of Patent: May 16, 2000

[54] ENERGY DISPENSING SYSTEM HAVING A BAR CODE SCANNING UNIT

[75] Inventors: Dolan Flay Blalock; Howard Weinstein, both of Greensboro, N.C.

[73] Assignee: Gilbarco Inc., Greensboro, N.C.

[21] Appl. No.: 09/174,149

[22] Filed: Oct. 16, 1998

[51] Int. Cl.[7] .......... G06F 7/08

[52] U.S. Cl. .......... 235/381; 235/384; 235/462.01; 235/462.13

[58] Field of Search .......... 235/375, 380, 235/381, 384, 439, 454, 462.01, 462.13, 462.22, 462.43, 470, 483, 485; 705/413

[56] References Cited

U.S. PATENT DOCUMENTS

| | | | |
|---|---|---|---|
| 3,786,421 | 1/1974 | Wostl et al. | 235/381 |
| 4,469,149 | 9/1984 | Walkey et al. | 235/384 X |
| 5,327,066 | 7/1994 | Smith | 235/381 X |
| 5,500,640 | 3/1996 | Zhou et al. | 235/384 X |
| 5,700,999 | 12/1997 | Streicher et al. | 235/381 |
| 5,717,374 | 2/1998 | Smith | 235/384 X |
| 5,729,002 | 3/1998 | Samples | 235/462.01 |
| 5,742,229 | 4/1998 | Smith | 235/381 X |
| 5,895,457 | 6/1999 | Kurowski et al. | 235/381 X |
| 5,913,180 | 6/1999 | Ryan | 235/381 X |

FOREIGN PATENT DOCUMENTS

| | | | |
|---|---|---|---|
| 98/37518 | 8/1998 | WIPO | G07B 15/02 |

*Primary Examiner*—Thien M. Le
*Assistant Examiner*—Jared J. Fureman
*Attorney, Agent, or Firm*—Coats & Bennett, PLLC

[57] ABSTRACT

A bar code reader system is required to be integrated into an energy dispenser that is able to read a variety of bar code formats printed on a variety of media. The bar code reader system accepts both bar encoded cards having very low aspect ratios and other printed bar encoded media having differing aspect ratios. The system also provides a robust scanning pattern such that other printed bar encoded media can be placed into a receiving cavity without regard to a particular orientation. Further, the system provides a sensing mechanism capable of determining when a card has been inserted into the system or when another bar encoded media has been placed into the receiving cavity.

19 Claims, 4 Drawing Sheets

80
60
70
30
40
50
20
20
10

ENERGY DISPENSING SYSTEM HAVING A BAR CODE SCANNING UNIT

TECHNICAL FIELD

The present invention relates generally to bar code readers. More particularly, the present invention relates to a system of mounting and using bar code readers on energy dispensing devices.

BACKGROUND ART

New, traditionally non-fuel retailers are now selling fuel. These companies often have membership cards printed with bar codes that are used to register preferential pricing. Previous attempts at packaging a bar code reader into a fuel dispenser had several shortcomings. One such example is the use of a single scan line reader attached to an existing magnetic stripe card reader. The resulting assembly is confusing for customers attempting to determine proper card orientation for insertion and frustrating due to the lack of tolerance in reading poorly printed bar codes. Such a device is also very limited in the type or shape of bar code formats which can actually be read. Furthermore, such an arrangement is incapable of reading bar codes printed on any other media, such as receipts, coupons, or the like.

Of particular note is the PCT application entitled "*Bar Code Reader for a Fuel Dispenser*" published in the name of Dresser Industries, Inc. on Aug. 27, 1998 as International Application No. WO 98/37518 (hereinafter "WO 98/37518"). WO 98/37518 discloses a bar code reader system for a fuel dispenser. In its most detailed embodiment (FIG. 5), WO 98/37518 includes both a bar code reader 118 for accepting bar code encoded cards and also a front surface mounted mechanism 120 for reading other bar code media such as printed receipts and the like. Thus, WO 98/37518 requires the implementation of at least two separate optical scanning devices. Moreover, the surface mounted mechanism 120 is shaped like a cross necessitating that the customer present bar encoded media for reading in either an entirely horizontal or an entirely vertical orientation in order to successfully be read.

WO 98/37518 does not contemplate an integrated unit for reading both a very low aspect ratio bar encoded card and other bar encoded media of varying aspect ratios using a single optical scanning device. Moreover, the present invention incorporates multi-line scanning and optical equipment which allow for consistent readability of low and high aspect ratio cards. The multiline scanning and optical equipment disperses a radial scan pattern which effectively allows the customer to insert other bar encoded media into a receiving cavity without having to specifically orient the bar code with the scanning device. Lastly, the present invention includes a sensing mechanism capable of determining when a card has been inserted into the reading area or when other bar encoded media have been inserted into the receiving cavity. Upon detection of such an occurrence, then, and only then, will the system activate the optical scanning equipment. Thus, a significant reduction in mechanical wear of the optical scanning equipment is achieved since the unit is only active when necessary. It is not continuously running in anticipation of reading a bar encoded card or other bar encoded media.

Significant room for improvement therefore exists in the art of bar code readers, particularly for a system of mounting and using a bar code reader on an energy dispensing device.

The present invention consistently reads cards having a very low aspect ratio bar code placed thereon (very short stripes relative to a wide code length). Such cards may also have inconsistent and/or generally poor print quality. With this type of bar code to be read, alignment of the bar code to the scan line is critical and may only vary by a few degrees and still achieve a successful "read." This is because a scanner, with its associated deciphering algorithms, "knows" when a good read has been made by recognizing the blank space on either side of the bar code, indicating that a complete code is in between. If the scan line goes across the bar code at some skewed angle such that the scan line does not reach completely across the bar code at the same instant, a "read" will not take place.

DISCLOSURE OF THE INVENTION

The present invention provides a bar code reader system capable of consistently reading cards having a very low aspect ratio bar code with potentially inconsistent and/or generally poor print quality. The present invention uses a guide means to direct the proper insertion and removal of the card into the path of the scan lines being projected from a multi-line scanner. The low aspect ratio bar code format is one of the toughest to read because of the relatively precise registration and alignment required between the card and the line projected from the scanner. The present invention, however, utilizes a scanner that disperses an array of twenty-one (21) lines in seven (7) groups of three (3) parallel lines each. The orientation of the scanner to the card produces the opportunity for high reliability reads through designed-in redundancy. At least two of the strongest parallel scan lines are precisely projected onto the path the card travels to allow for three (3) chances for reading the bar code during insertion and removal of the card from the guide means.

The present invention also permits the reading of bar codes printed in the dispenser's own receipt paper (printed at the dispenser), coupons from newspapers or other publications, and key chain size customer loyalty tags and various other bar encoded media. These tasks are accomplished without increasing confusion to the customer and, better yet, by taking advantage of processes and/or tasks that the customer is already familiar with and comfortable performing. This is achieved by providing a receiving cavity below the card guide means that is spacious enough to easily place, into a readable position, a wide array of other printed bar code media. A single scanner is capable of scanning both bar encoded cards inserted into the card guide and other bar encoded media placed into the receiving cavity since both areas are within the line of sight of the scanner. The present invention also has a high tolerance for bar code formats having a substantially higher aspect ratio which may be placed in no particular orientation to the optical scanning equipment. Because of the multiple scan lines and the geometry of the receiving cavity, almost any flat bar code smaller than approximately 60 mm across can be read without regard to its particular orientation within the receiving cavity.

In addition, depending on the space available behind the guide means, the scan engine may be positioned so as to project directly onto the card slot path and read area. If space restraints prohibit this orientation, a mirror is used to reflect the scan pattern into the bar code read area.

The present invention further provides a sensing mechanism for determining when a card has been placed in the slot or when another bar coded media has been placed in the receiving cavity. Only upon detection of a card or other media will the system activate the optical scanning equipment. Thus, a significant reduction of the wear and tear of the scanning equipment is achieved since it does not need to be continuously running.

Therefore, it is an object of the present invention to provide a mechanism that can accept both bar coded cards having very low aspect ratios and other printed bar code media having differing aspect ratios.

It is a further object of the present invention to provide a robust scanning pattern such that other printed bar code media can be placed into the receiving cavity without regard to a particular orientation.

It is a still further object of the present invention to provide a sensing mechanism capable of determining when a card has been inserted into the guide means or when another bar code media has been placed into the receiving cavity.

Some of the objects of the invention having been stated hereinabove, other objects will become evident as the description proceeds, when taken in connection with the accompanying drawings as best described hereinbelow.

BEST MODE FOR CARRYING OUT THE INVENTION

"Pay at the Pump" fuel dispensing has been in existence for the last decade. "Pay at the Pump" devices, such as a CRIND® (Card Reader in Dispenser) manufactured by Gilbarco, Inc., allow a customer to fuel his automobile and pay for the transaction without having to interact with a cashier or otherwise leave the proximity of the fuel dispenser. This procedure is typically achieved by incorporating a credit or debit card accepting means right on the dispenser itself which is electrically connected to a point-of-sale device which validates the transaction. The usual transaction requires the insertion of a magnetic stripe encoded card into the card accepting means of the fuel dispenser.

Another more recent innovation is the use of RF transponder devices which are given to customers and are communicable with RF circuitry within a fuel dispenser. Upon bringing such a customer transponder within close enough proximity to a particular fuel dispenser, the customer can effect a transaction and fuel his automobile.

Some well known wholesale shopping clubs are venturing into the retail fuel business and will likely be installing fuel dispensers on site. Typically, these wholesale shopping clubs utilize bar coded membership cards as a means of tracking customer account data. It would be cost efficient and highly convenient if these wholesale shopping clubs could make use of their existing bar encoded system by incorporating it into newly installed fuel dispensers. Thus, a need has arisen for fuel dispensers to be able to accept bar encoded media for payment and/or identification. Bar encoded membership cards are, however, only one type of bar encoded media. Others such as coupons, UPC labels, pre-printed receipts, and the like are ideal candidates for use with fuel dispensers.

For instance, a customer could purchase several items in the store and inform the cashier that he wishes to buy $10 worth of gasoline as he exits. The cashier would then print a bar coded receipt representing $10 worth of gas. The customer would then present the pre-printed bar coded receipt to the fuel dispensers bar code reading mechanism for validation. Upon validation, the customer would dispense $10 of fuel into his automobile. In a second example, loyal customers may be rewarded with bar encoded gas coupons if they spend a certain amount of money each month at the club. Other scenarios are readily conceivable and need not be described herein.

Figure 1:
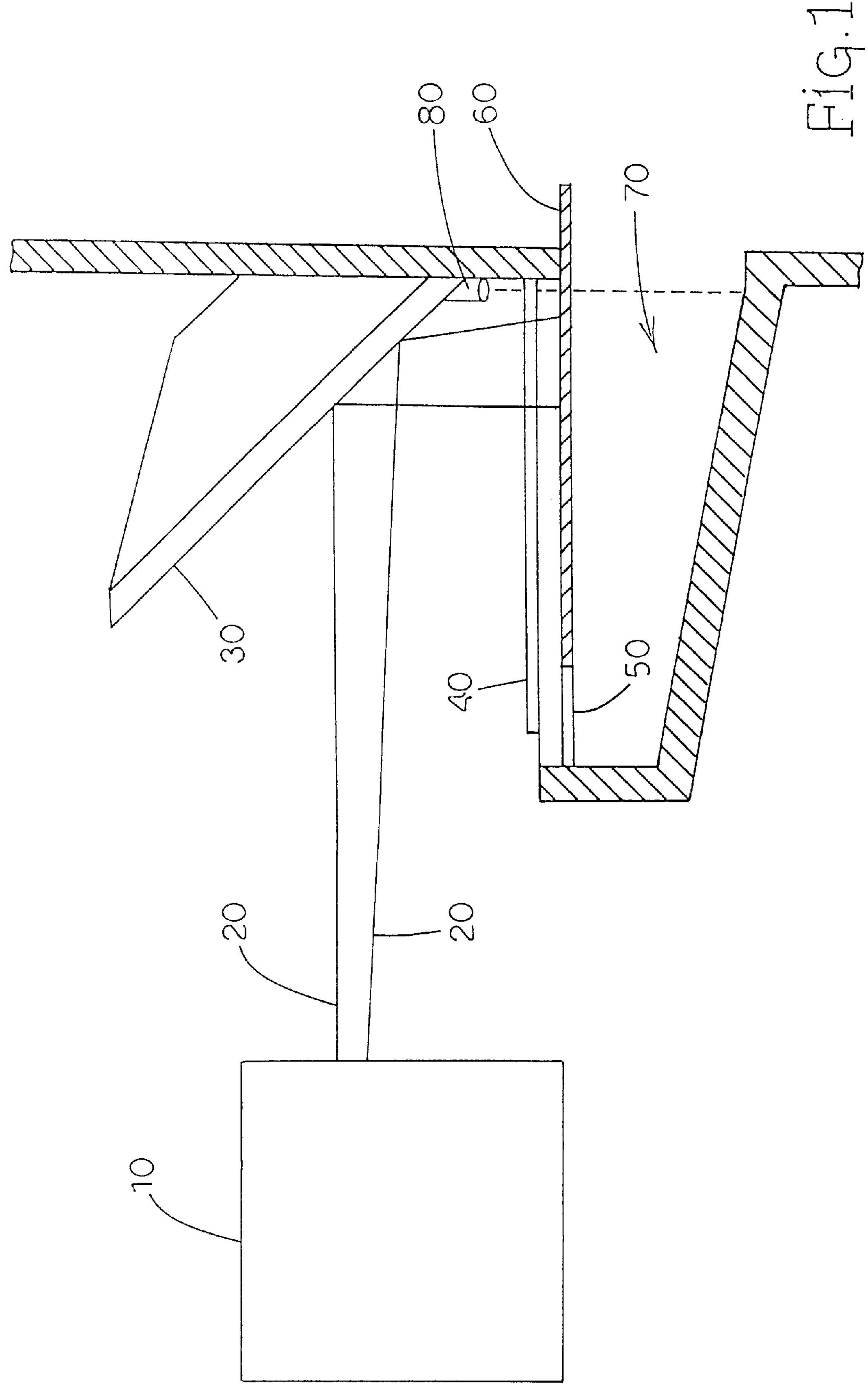
FIG. 1 illustrates the bar code scanning elements for the integrated card guide means and receiving cavity capable of reading bar coded media.

FIG. 1 illustrates the bar code scanning elements for the integrated unit capable of reading bar encoded media. Scanner 10 emits scan beams 20 which are reflected off of appropriately angled mirror 30 through a transparent shield 40 into an area suitable for reading bar encoded media. Directly beneath transparent shield 40 is card guiding means 50. Card guiding means 50 is designed such that a bar encoded card 60 (e.g., a wholesale shopping club membership card) is received and channeled into the area suitable for reading the bar code. In addition, below card guiding means 50 is a receiving cavity 70 designed to accept other bar encoded media such as pre-printed receipts, coupons, or the like.

Also shown in FIG. 1 is a sensing mechanism 80 which is positioned such that its field of vision intersects near the leading edge of both the card guide means 50 and the receiving cavity 70. The purpose of sensing mechanism 80 is to detect the insertion of a card 60 into the card guide means 50 or the insertion of other bar encoded media into the receiving cavity 70. The instant a card, hand, coupon, etc. is detected, the scanner 10 is activated and the scanning process is initiated. Sensor 80 is modulated so as not to be affected by ambient light conditions. The life of scanner 10 and its associated components, especially the laser light emitting diode, is prolonged substantially by not running scanner 10 continuously and keeping the duty cycle to a minimum. This also keeps the build up of heat within the system to a minimum and helps prolong service life of the equipment, in general.

Figure 2:
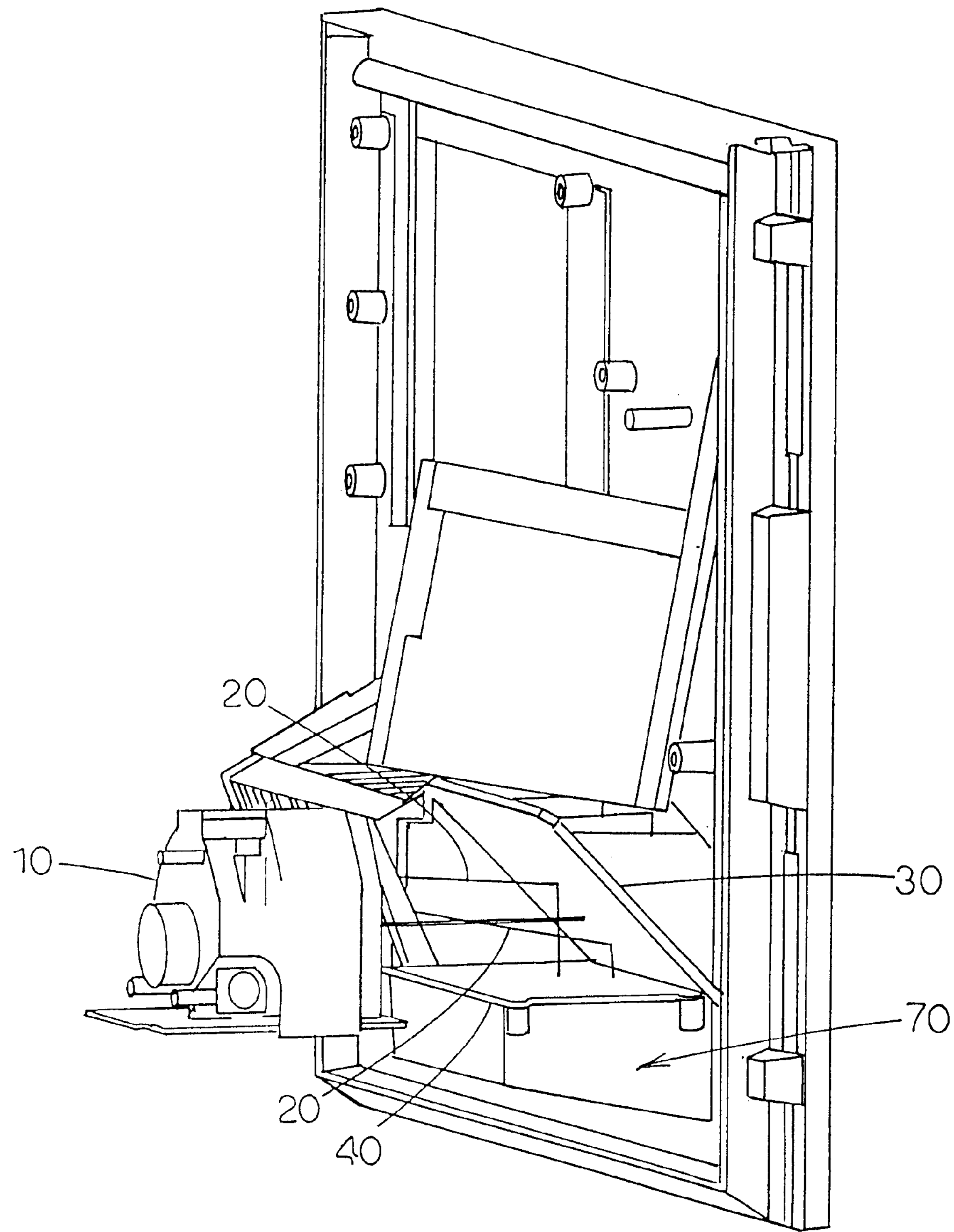
FIG. 2 illustrates a rear perspective view of the bar code reading elements.

FIG. 2 illustrates a rear perspective view of the bar code reading elements. This figure is essentially a rear side view of a cut-out portion of a fuel dispenser front panel. Scanner 10 is shown emitting scan beams 20 off of mirror 30 down through transparent shield 40 into receiving area 70.

Figure 3:
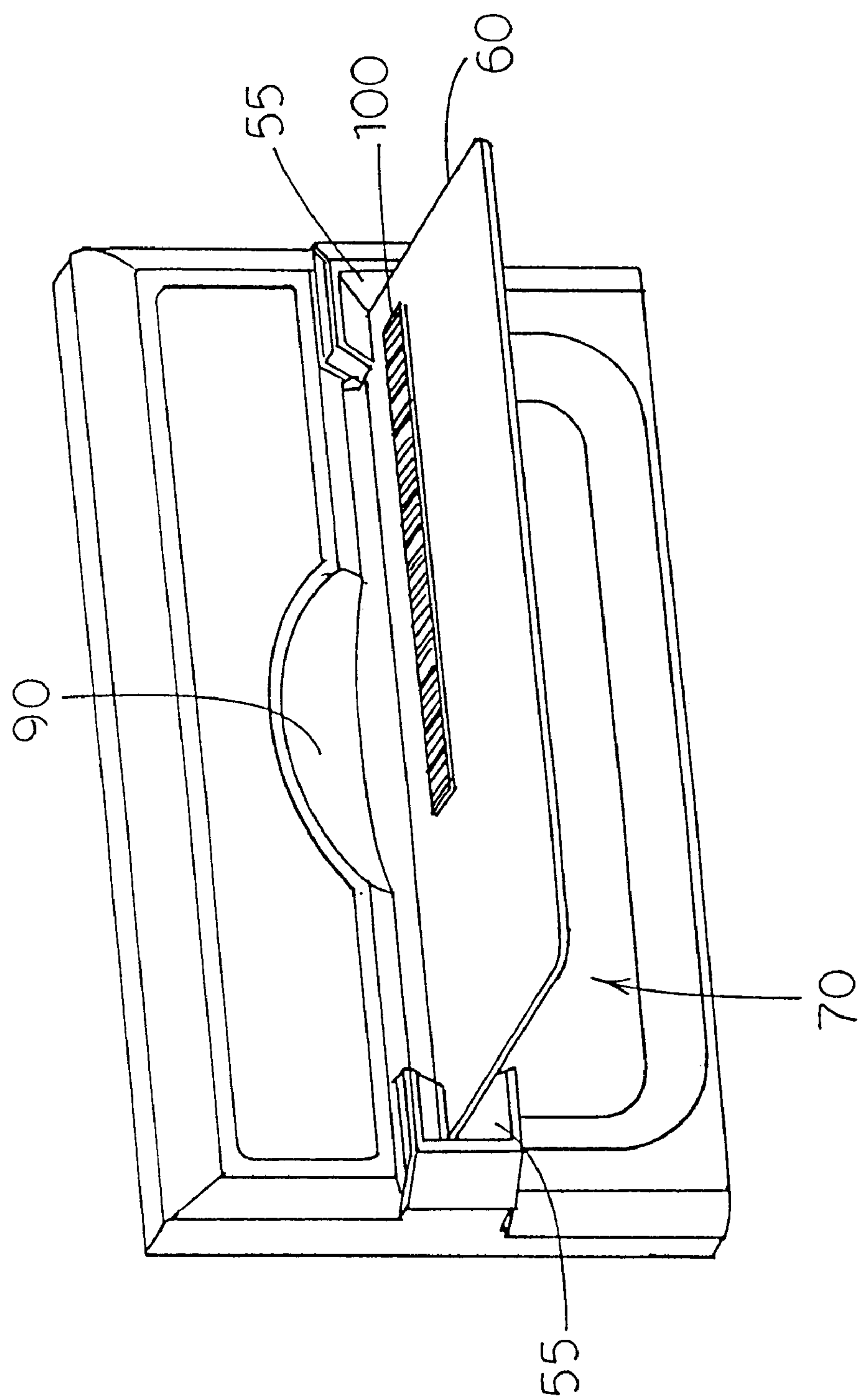
FIG. 3 illustrates a front perspective view of the card guiding means with a card partially inserted.

According to one use of the present system, the customer inserts a card 60 typically having a very low aspect ratio bar code (short height relative to a long width) into card guide means 50. Referring now to FIG. 3, the card guide means comprises, interalia, molded plastic bezel/card guide rails 55 that direct the proper insertion and removal of a bar-coded 100 card 60. Card guide means 50 is substantially flush mounted into the front panel of an energy dispensing device. The design of card guide means 50 mimics that of a magnetic stripe card reader to the extent that it helps the customer locate the insertion slot through the use of protruding guide rails 55. A card 60 inserted into the slot formed by guide rails 55 is then slid into the path of the scan beams 20 being projected from multi-line scanner 10. In this embodiment, the preferred scanner 10 is made by NCR (NCR model 7890) and broadcasts an array of twenty-one (21) lines (seven (7) groups of three (3) parallel lines each).

The orientation of scanner 10 to card 60 produces high reliability card reads through designed-in redundancy. At least two of the strongest parallel scan lines 20 are precisely projected onto the path card 60 travels to achieve three (3) chances for reading bar code 100 during insertion and/or removal of card 60 from guide means 50. The card slot is designed to accept card 60 "long edge first," which is perpendicular to the insertion direction of magnetic stripe readers. This insertion orientation compensates for potentially poorly printed bar codes, as bar code 100 is passed perpendicular to stationary scan lines 20 yielding nearly 100% readability of bar codes of this format. Another feature shown in FIG. 3 is a thumb indentation 90 positioned above and centered between card guide rails 55. Indentation 90 assists the customer in inserting his card 70 to the proper depth for reading, and in retrieving the card.

Alternatively, the customer places a bar encoded media such as a coupon or pre-printed receipt into receiving cavity 70 directly below card guide means 50. Receiving cavity 70 is large enough to easily place into a readable position a wide array of other printed bar encoded media including, but not limited to, bar codes printed on the dispenser's own receipt paper (i.e., printed at the dispenser), coupons from newspapers or other publications, and key chain sized customer loyalty tags. When used in this fashion the present invention has high tolerance for bar code formats having substantially higher aspect ratios. Because of the multiple scan line pattern, the geometry of receiving cavity 70, and a higher aspect ratio bar code (e.g., closer to a square shape), virtually any relatively flat bar code less than approximately 60 mm across can be read and processed without regard to its orientation within receiving cavity 70. At the same time, receiving cavity 70 is small enough to prohibit the credit card-sized membership card 60 from being inserted long edge first anywhere other than the designated card guide means 50, thus minimizing confusion and frustration to the customer.

Figure 4:
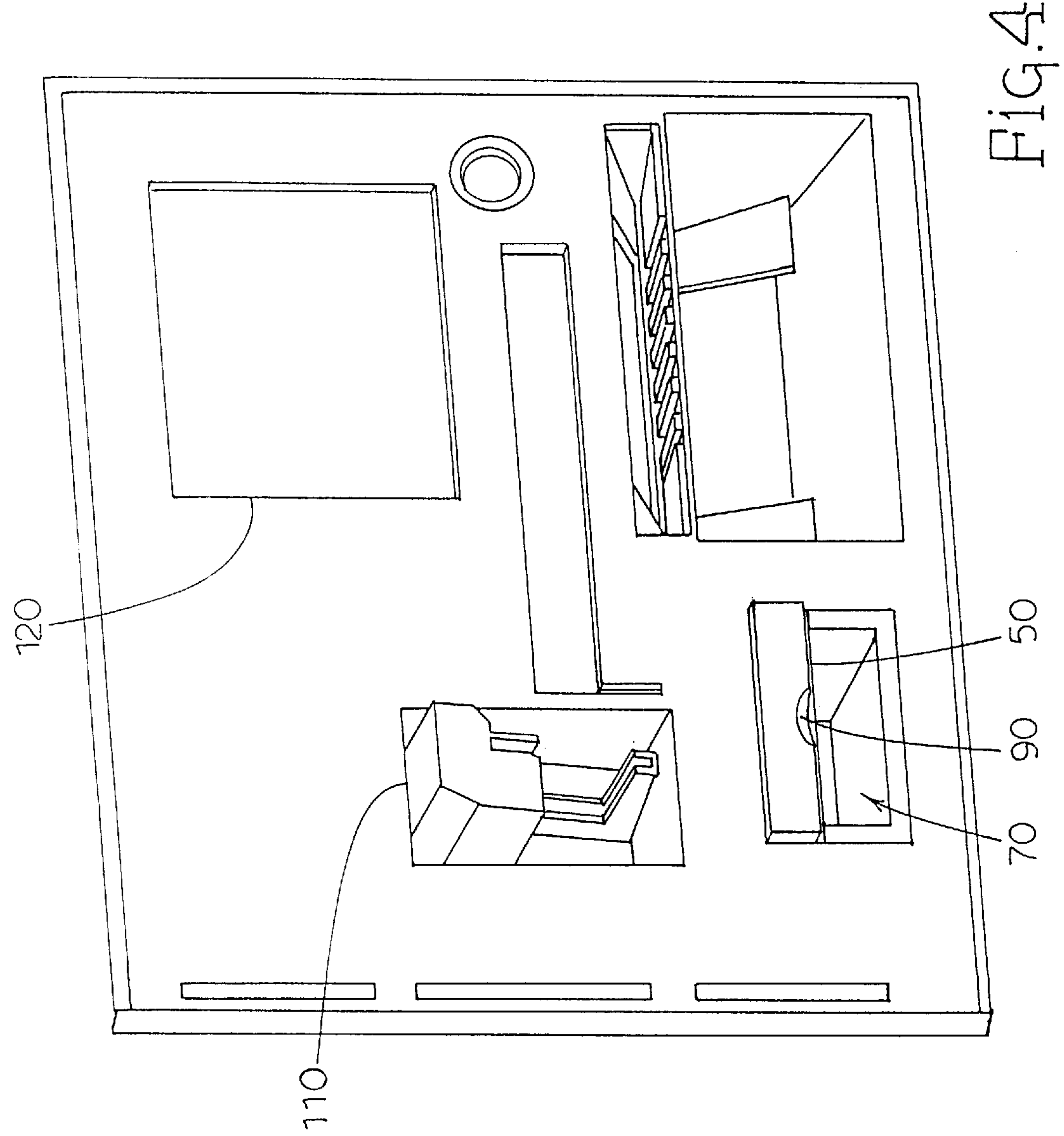
FIG. 4 illustrates a partial front view of an energy dispensing device showing one possible orientation of a customer interface.

FIG. 4 illustrates a partial front view of an energy dispensing device showing one possible orientation of a customer interface. A standard magnetic stripe card reader 110 is shown in the upper left portion of the panel. Directly beneath is the integrated unit for accepting and reading multiple types of bar coded media. The unit shows the front perspective view of card guide means 50, receiving cavity 70, and thumb indentation 90. In the upper right portion a display screen 120 is shown.

Depending on the space available behind card guide means 50, scanner 10 may be positioned so as to project directly on to the card slot path and read area. If other equipment prohibits this orientation, a mirror may be used to reflect the scan pattern into a "read" area. Direct projection is preferred because to eliminates a variable from the assembly and maximizes the reliability/repeatability of the bar code reader assembly.

It can therefore be seen that the present invention provides a mechanism that can accept both bar coded cards having very low aspect ratios and other printed bar code media having differing aspect ratios. It can also be seen that the present invention to provides a robust scanning pattern such that other printed bar code media can be placed into the receiving cavity without regard to a particular orientation. Lastly, it can be seen that the present invention to provides a sensing mechanism capable of determining when a card has been inserted into the guide means or when another bar code media has been placed into the receiving cavity.

It will be understood that various details of the invention may be changed without departing from the scope of the invention. Furthermore, the foregoing description is for the purpose of illustration only, and not for the purpose of limitation, as the present invention is defined by the following, appended claims.

What is claimed is:

1. In an energy dispensing system, a bar code reading mechanism integrated with said energy dispensing system capable of reading a variety of bar code shapes and sizes in order to process a transaction, said bar code reading mechanism comprising:

(a) a bar code scanning unit coupled with said energy dispensing system for directing a plurality of scan beams into a readable area;

(b) a card guide having card guide rails on both sides of the readable area of the scanning unit, said card guide for accepting a bar encoded card and guiding said bar encoded card into the readable area of said scanning unit; and (c) a receiving cavity for accepting other bar encoded media to be read and processed into the readable area of said scanning unit.

2. The system of claim 1 further comprising an optical sensor for activating said scanning unit upon detecting the insertion of a card in said card guide or other bar encoded media into the receiving cavity.

3. The system of claim 2 wherein said optical sensor is positioned immediately above a leading edge of both the card guide and the receiving cavity.

4. The system of claim 1 wherein the scanning unit radiates a plurality of scan beams in a geometric pattern such that the orientation of an inserted bar encoded media into said receiving cavity is inconsequential to its ability to be read and processed.

5. The system of claim 4 wherein said scan beams are reflected off a mirror within said energy dispensing device into the readable area of said scanning device.

6. The system of claim 5 further comprising a transparent shield within said energy dispensing device positioned above and substantially co-extensive with said card guide for the purpose of sealing the scanning unit from the outside environment.

7. The system of claim 1 wherein said receiving cavity has an inclined bottom surface for positioning an inserted bar encoded media at an angle.

8. The system of claim 7 wherein the geometry of said receiving cavity is such that a standard credit-card sized card can be inserted long edge first.

9. The system of claim 1 wherein said card guide further comprises an indentation sized to accommodate a customer's thumb positioned above and centered substantially between said card guide rails, said indentation for facilitating insertion of said bar encoded card to its proper depth within said card guide while giving a customer sufficient room to retain a firm grasp of said bar encoded card.

10. The system of claim 1 wherein said card guide is substantially flush mounted to an exterior housing of said energy dispenser device such that said card guide is readily accessible to a customer.

11. The system of claim 1 wherein said receiving cavity is positioned beneath said card guide such that an opening of the receiving cavity allows a customer to insert bar encoded media therein.

12. In an energy dispensing system having an exterior panel suitable for customer interaction, a bar code reading mechanism integrated within said energy dispensing system capable of reading a variety of bar code shapes and sizes which is accessible to a customer via said exterior panel wherein a customer presents a bar encoded media to the bar code reading mechanism in order to process a transaction, said bar code reading mechanism comprising:

(a) a bar code scanning unit coupled with said energy dispensing system for directing a plurality of scan beams into a readable area where said customer places a bar encoded media;

(b) a card guide having card guide rails on both sides of the readable area of the scanning unit, said card guide for accepting a bar encoded card and guiding said bar encoded card into the readable area of said scanning unit wherein said card guide is fixed to the exterior panel of said energy dispenser device such that it is readily accessible to a customer; and (c) a receiving cavity for accepting other bar encoded media to be read and processed into the readable area of said scanning unit wherein said receiving cavity is positioned beneath said card guide such that an opening of the receiving cavity allows a customer to insert bar encoded media therein.

13. The system of claim 12 further comprising an optical sensor for activating said scanning unit upon detecting the insertion of a card in the card guide or other bar encoded media into the receiving cavity, said optical sensor positioned immediately above a leading edge of both the card guide and the receiving cavity.

14. The system of claim 12 wherein the scanning unit radiates a plurality of scan beams in a geometric pattern such that the orientation of an inserted bar encoded media into said receiving cavity is inconsequential to its ability to be read and processed.

15. The system of claim 14 wherein said scan beams are reflected off a mirror fixed within said energy dispensing device into the readable area of said scanning device.

16. The system of claim 15 further comprising a transparent shield fixed within said energy dispensing device positioned above and substantially co-extensive with said card guide for the purpose of sealing the scanning unit from the outside environment.

17. The system of claim 12 wherein said receiving cavity has an inclined bottom surface for positioning an inserted bar encoded media at an angle that maximizes readability of the bar code.

18. The system of claim 17 wherein the geometry of said receiving cavity is such that a standard credit-card sized card can be inserted long edge first.

19. The system of claim 12 wherein said card guide further comprises an indentation sized to accommodate a customer's thumb positioned above and centered between said card guide rails, said indentation for facilitating insertion of said bar encoded card to its proper depth within said card guide while giving a customer sufficient room to retain a firm grasp of said bar encoded card.

* * * * *